(12) United States Patent
Piller et al.

(10) Patent No.: US 6,234,432 B1
(45) Date of Patent: May 22, 2001

(54) MOVABLE STAND ARRANGEMENT FOR A VEHICLE HARDTOP

(75) Inventors: Anton Piller, Ditzingen; Klaus Hübert, Steinheim; Dieter Reuter, Ehningen, all of (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 08/869,846

(22) Filed: Jun. 5, 1997

(30) Foreign Application Priority Data

Jun. 5, 1996 (DE) ............................................. 196 22 508
Dec. 20, 1996 (DE) ............................................. 196 53 407

(51) Int. Cl.[7] ........................................................ A47K 1/04
(52) U.S. Cl. ........................ 248/129; D34/17; 211/195; 248/456; 280/79.3
(58) Field of Search ........................ 248/129, 127, 248/456; 211/104, 132, 195; 280/79.1, 79.3; 206/335; D34/17

(56) References Cited

U.S. PATENT DOCUMENTS

D. 288,739 * 3/1987 Johnson, Jr. et al. ................. D34/17
D. 303,031 * 8/1989 Ellis ....................................... D34/17
4,326,726   4/1982 Dunchock ........................... 280/79.1
5,253,887  10/1993 Marenger ........................... 280/79.3
5,445,279   8/1995 Warner ................................ 211/195

FOREIGN PATENT DOCUMENTS 2223460A   4/1990 (GB) .

OTHER PUBLICATIONS

European Search Report, Mar. 26, 1999.

* cited by examiner

Primary Examiner—Ramon O. Ramirez
(74) Attorney, Agent, or Firm—Evenson, McKeown, Edwards & Lenahan, P.L.L.C.

(57) ABSTRACT

A receiving arrangement is suggested for a hard roof, particularly for a hardtop of a motor vehicle, which is arranged on a movable stand. The movable stand has a carrying device formed of struts which has at least four bearing receiving devices for the hardtop. These bearing receiving devices are arranged to correspond to locks and push-in tongues of the hardtop. The carrying device, together with the bearing receiving devices, is constructed to be separable from the stand and forms a separate, locally fastenable carrying device. Furthermore, it is provided that the stand can be adjusted into a horizontal working position, for which a supporting tube is used which can be supported on the basic stand.

20 Claims, 4 Drawing Sheets

MOVABLE STAND ARRANGEMENT FOR A VEHICLE HARDTOP

BACKGROUND AND SUMMARY OF THE INVENTION

This application claims the priority of German application 196 22 508.6 filed in Germany on Jun. 5, 1996, and German application 196 53 407.0 filed in Germany on Dec. 20, 1996, the disclosure of which is expressly incorporated by reference herein.

The invention relates to a receiving arrangement for a hardtop which has a movable stand.

From German Patent Document DE-GM 89 14 095, a collapsible rolling stand is known for depositing and moving away demounted hard roofs of convertibles. Furthermore, from German Patent Document DE 44 07 170 A1, a device is known for receiving and depositing a hardtop, in the case of which this hardtop is disposed to be suspended in a stand by way of holding brackets. While being held, the hardtop is supported by means of its two transversely extending roof edges, on the one side, on the moving stand and, on the other side, on an upright support column.

It is an object of the invention to provide a movable stand arrangement for a hardtop of a motor vehicle which ensures a secure bearing while an easy transportability is ensured. Furthermore, a movable stand arrangement for a hardtop is to be provided which, in addition to bearing the hardtop, permits additional usages.

According to the invention, this object is achieved by providing an arrangement wherein the movable stand has a carrying device which is formed of struts, has at least four bearing receiving devices for the hardtop, and these bearing receiving devices are arranged corresponding to locks and push-in tongues of the hardtop, the carrying device with the bearing receiving devices being constructed to be separable from the stand and forming a separate, locally fastenable carrying device.

Principal advantages achieved by means of the invention are that the hardtop is held in a receiving arrangement which, on the one hand, is constructed as a rolling stand and which, on the other hand, can also be removed from the rolling stand as a separate carrying device and can then be screwed to a wall or to a garage wall. This arrangement also provides the possibility of depositing the hardtop in a simple manner on the arrangement, of transporting it and of taking it off again.

The receiving arrangement essentially has a stand with two transverse bars in which, corresponding to the locks and push-in tongues of the hardtop, matching bearing receiving arrangements are provided. These are preferably constructed such that the push-in tongues arranged on the forward edge of the hardtop project into bearing receiving devices of a lower transverse bar of the stand and the latching locks in the center area of the hardtop lock into bearing receiving devices of an upper transverse bar of the stand. These locks are used on the vehicle for a fixing and locking on the vehicle body. Correspondingly, these locks can also be inserted and locked in the bearings of the transverse bars of the stand. As a result, the hardtop is securely held in the stand so that a falling-off the stand is prevented.

The stand comprises a basic frame which has rollers and to which two triangularly arranged stand struts are fastened on each side, which stand struts receive the one transverse bar with the bearing receiving devices on the upper free end. The other lower transverse bar with the bearing receiving devices is held by way of bearing blocks in the basic stand and, when the upper transverse bar is released from the stand, can be lifted out of the bearing blocks and can therefore be used as a separate stand for fastening on a wall in order to stationarily receive the hardtop.

Furthermore, in the basic stand, a stand strut is combined with an additional stand strut in such a manner that a bearing arrangement for bicycles is obtained in which these can be disposed vertically side-by-side.

According to another embodiment, the invention achieves the principal advantage that the carrying device for the hardtop in the stand can be swivelled at least into one additional position. These positions, such as working and receiving positions, are achieved by a supporting tube which can be supported in a carrier of the stand. For this purpose, the supporting tube has a different length, a long supporting tube being used in the working position and a shorter supporting tube being used in the receiving position for the hardtop.

Advantageously, the supporting tube is held in the crossing point of a transverse bar of the carrying device to be releasably inserted in a receiving sleeve so that an exchange for a supporting strut of different lengths can take place in a simple manner. The free end of the supporting tube which faces away from the receiving sleeve is supported in a carrier which is constructed as an angle section or similar section.

Other objects, advantages and novel features of the present invention will become apparent from the following detailed description of the invention when considered in conjunction with the accompanying drawings.

DETAILED DESCRIPTION OF THE DRAWINGS

Figure 1:
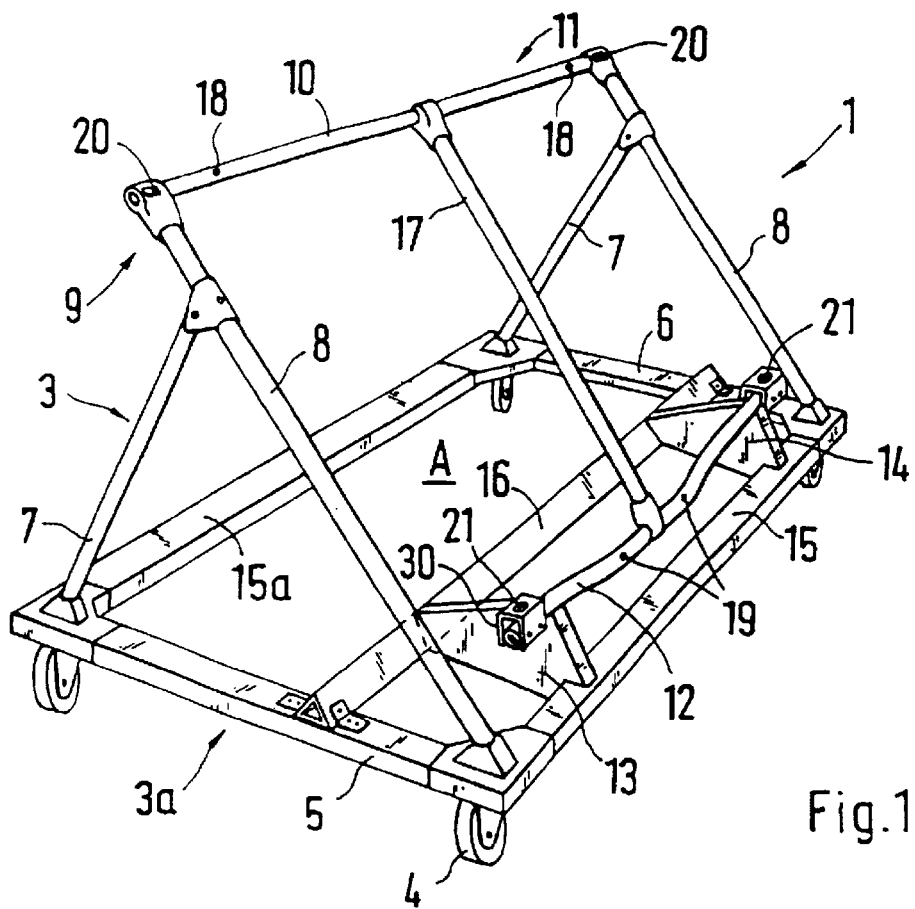
FIG. 1 is a schematic representation of a movable stand with a receiving arrangement for a vehicle hardtop, constructed according to a preferred embodiment of the present invention.

A receiving arrangement 1 for a hardtop 2 comprises essentially a basic frame 3a with a stand 3, in which case rollers 4 are provided on the basic frame 3a. The basic frame 3a has lateral supports 5, 6 on which triangularly erected struts 7, 8 are fastened which, on the free end 9, are connected with an upper transverse bar 10 of a hardtop carrier 11. A lower transverse bar 12 of the carrier 11 is supported in the basic stand 3a by way of bearing blocks 13, 14 which are connected with a side member 15 of the basic stand 3a and with an additional spaced side member 16. Both transverse bars 10, 12 are connected with one another by way of an upright bar 17 so that an H-shaped carrier 11 is obtained.

Figure 2:
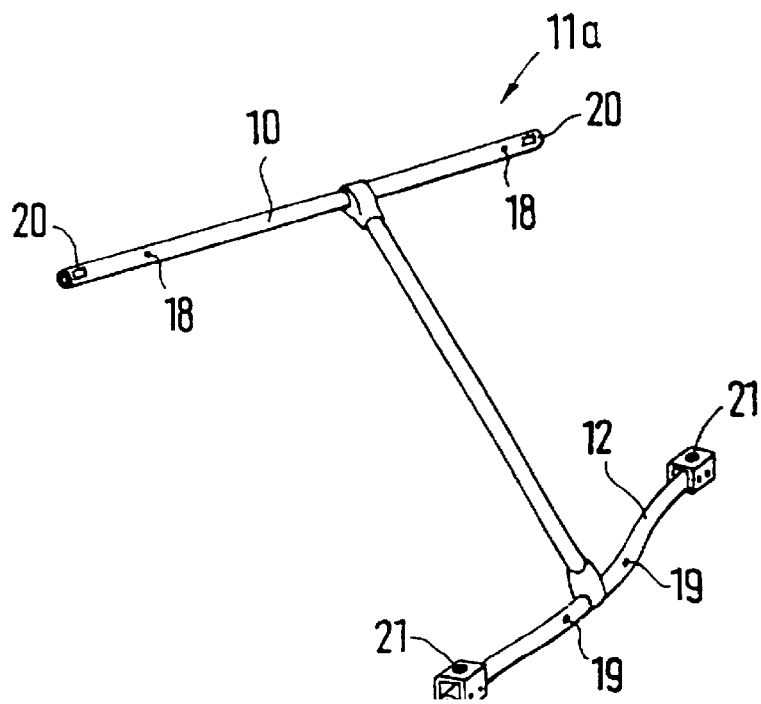
FIG. 2 is a schematic representation of the receiving arrangement from the FIG. 1 stand for use on a wall.
Figure 3:
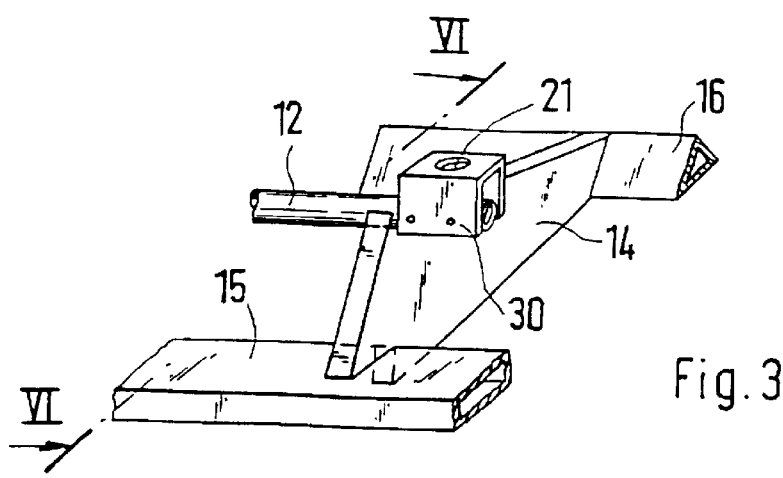
FIG. 3 is an enlarged representation of a bearing receiving device on a lower transverse strut of the movable stand of FIG. 1.
Figure 4:
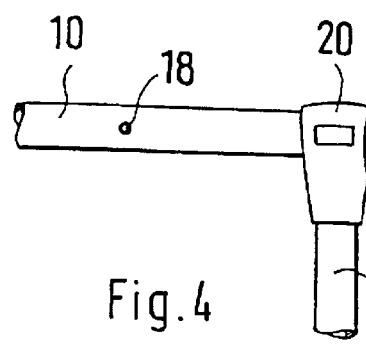
FIG. 4 is an enlarged representation of a bearing on an upper transverse strut of the movable stand of FIG. 1.

The upper transverse bar 10 is releasably connected with the strut 8, and the lower transverse bar 12 is held in the bearing blocks 13, 14 in receiving devices 13a which are open toward the top. The carrier 11 can therefore be lifted out of the stand 3 of the receiving arrangement 1, as illustrated in detail in FIG. 2 and forms a separate carrier 11a. A fastening to a wall, for example, a garage wall, takes place by means of holding screws which penetrate bores 18, 19 in the transverse bars 10, 12. The transverse bars 10, 12 are arranged in the stand 3 of the receiving arrangement 1 such that the hardtop 2 is received in an approximately vertically standing manner in the bearing receiving devices 20, 21 of the transverse bars 10, 12.

Figure 5:
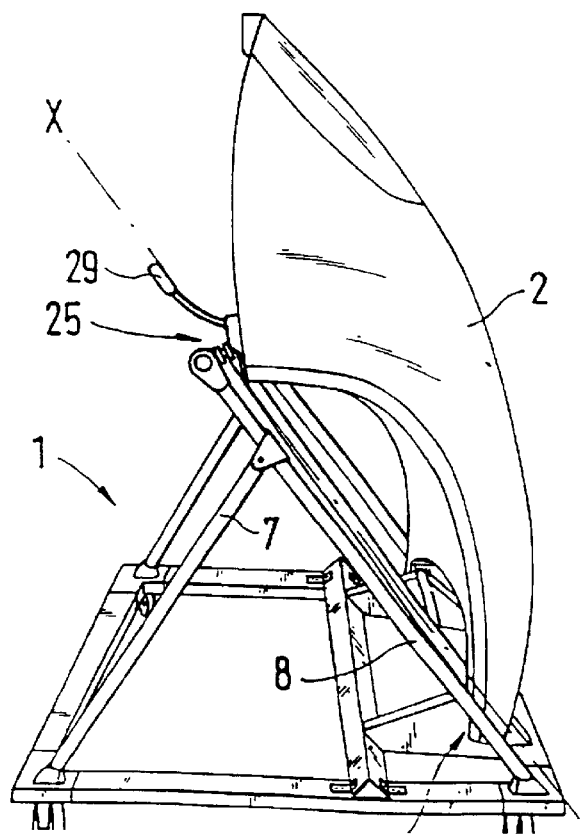
FIG. 5 is a perspective view of the movable stand of FIG. 1, with a vehicle hardtop disposed thereon.
Figure 6:
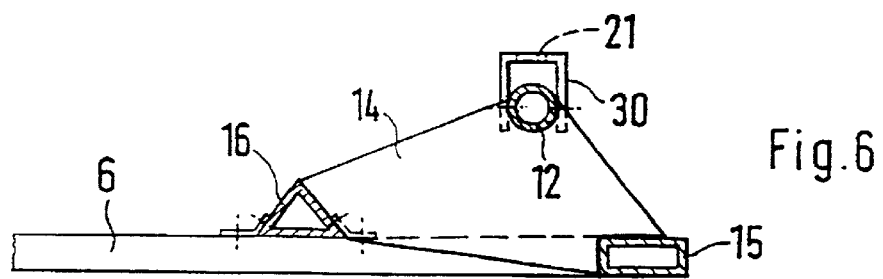
FIG. 6 is a sectional view along Line VI—VI of FIG. 4.
Figure 7:
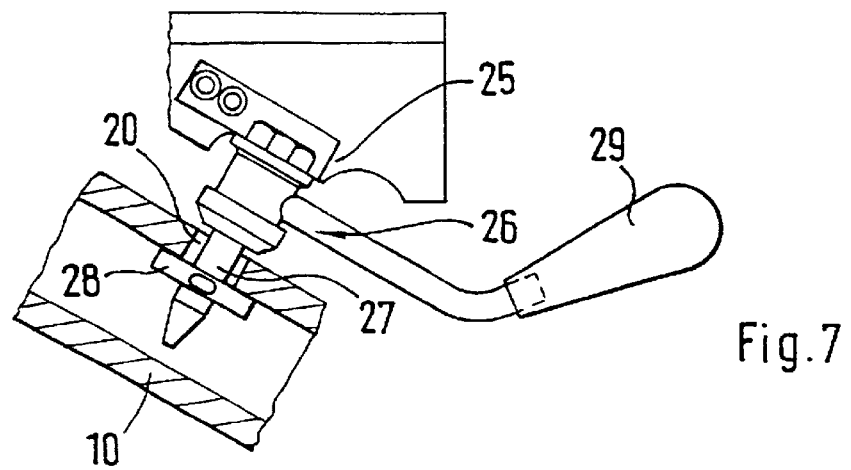
FIG. 7 is a side part sectional view of a lock for the hardtop in the center area.

As illustrated in FIG. 5 in conjunction with FIG. 7, the hardtop 2 has two latching locks 26 in the center roof area 25 which consist of detent pins 27 having a transverse striker 28. The detent pin 27 is inserted into the bearing receiving devices 20 of the upper transverse bar 10, and for the locking, the pin 27 is rotated by means of a grip 29 so that the striker 28 will take up the illustrated latching position in the bearing receiving device 20.

Figure 8:
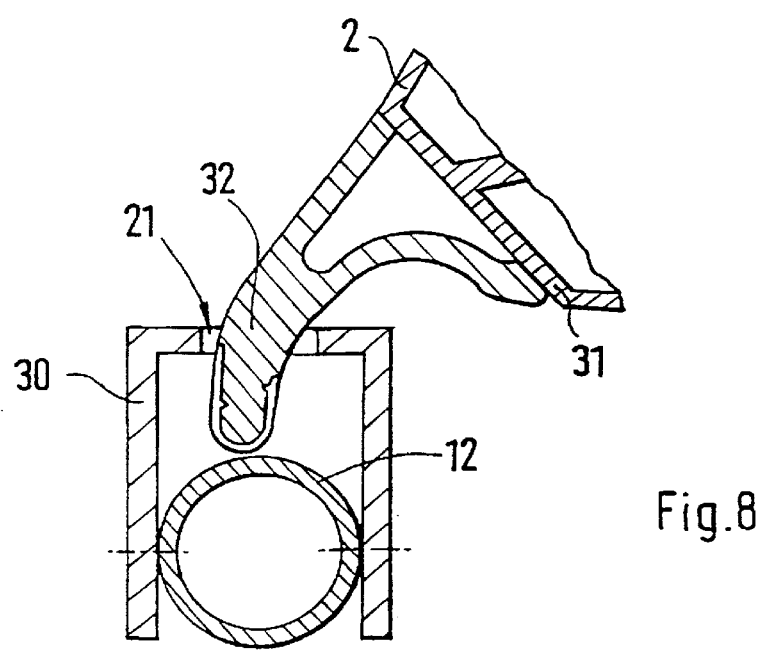
FIG. 8 is a view of a push-in tongue of the hardtop on the forward edge.

FIG. 8 illustrates the lower transverse bar 12 with the bearing receiving device 21 in a holding element 30, in which case the holding element 30 is connected with the lower transverse bar 12. On the forward edge 31 of the hardtop 2, push-in tongues 32 are arranged which hook into bearing receiving devices 21 of the holding element 30 in the transverse bar 12 and hold the hardtop 2 in position, as illustrated in detail in FIG. 5.

In the basic stand 3a, between a side member 15a and the additional side member 16, the receiving arrangement 1 forms a receiving device A for bicycles which are supported by means of their running surfaces on these two carriers.

Figure 9:
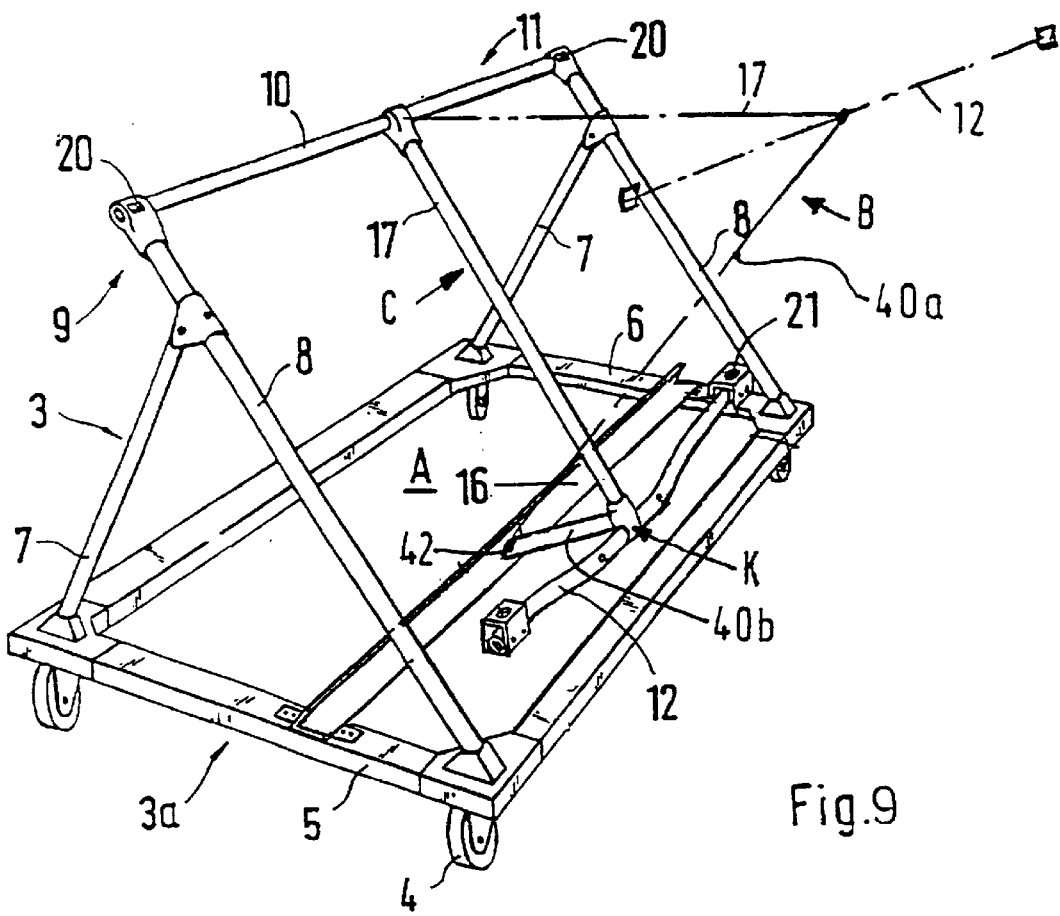
FIG. 9 is a view of another embodiment of a carrying stand with a supporting strut.
Figure 10:
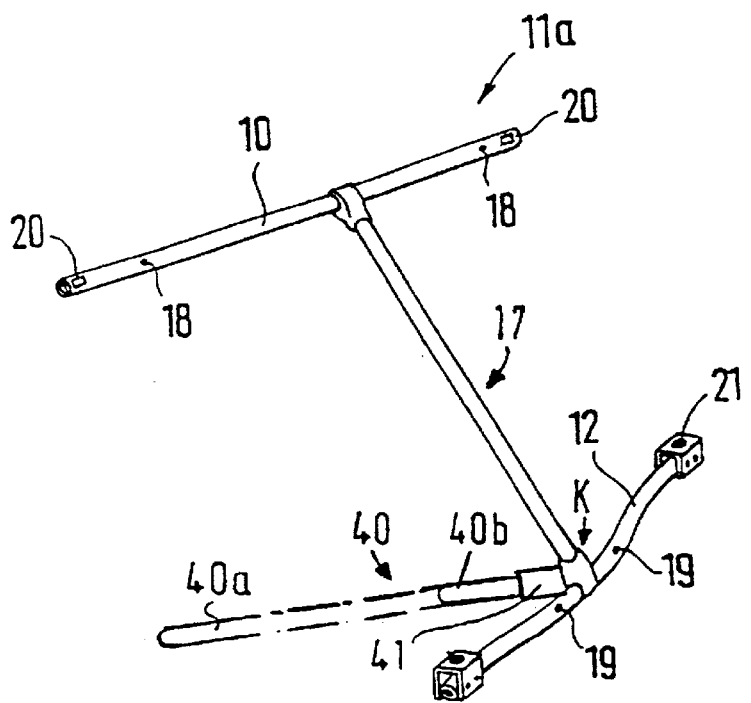
FIG. 10 is a view of a part of the stand of FIG. 9 with a joined supporting strut.

According to another embodiment according to FIGS. 9 and 10, the receiving arrangement 1 for a hardtop (not shown) has the basic frame 3a with the stand 3, in which case the rollers 4 are provided on the basic frame 3a. This basic frame has the lateral supports 5, 6 on which the triangularly erected struts 7, 8 are fastened which, on the free end 9, are connected with one of the transverse bar 10 of a hardtop carrier 11. The lower transverse bar 12 of the carrier 11 is supported in the basic stand 3a by way of a supporting tube 40. Both transverse bars 10, 12 are connected with one another by way of the upright bar 17 so that the H-shaped carrier 11 is obtained.

The upper transverse bar 10 is releasably connected with the strut 8 and has a swivellable construction. The carrier 11 can therefore be lifted out of the stand 3 of the receiving arrangement 1, as illustrated in detail in FIG. 2, and forms a separate carrier 11a. A fastening to a wall, for example, to a garage wall, takes place by way of holding screws, which penetrate bores 18, 19 in the transverse bars 10, 12. The transverse bars 10, 12 are arranged in the stand 3 of the receiving arrangement 1 such that the hardtop 2 is received in an approximately vertically standing manner in the bearing receiving devices 20, 21 of the transverse bars 10, 12. For this purpose, the supporting tube 40b is of a relatively short length.

In the junction point K, the bar 17 is arranged to be connected with the transverse bar 12 and the supporting tube 40 is arranged to be fitted into a receiving sleeve 41 of the junction point K. The tube 40 supports the carrier 11a in a side member 16 which consists, for example, of an angle section in which the free end 42 of the supporting tube is held.

As illustrated in detail in FIG. 9, the receiving position for the hardtop is shown by solid lines and the horizontal operating position B is shown by dash-dotted lines. In this position B, the carrier 11a is supported by way of a long supporting tube 40a on the side member 16, the shorter supporting tube 40b indicating the receiving position C.

The supporting tubes 40a and 40b can be mutually exchanged in a simple manner in that they are pulled out of the supporting sleeve 41. The position change of the carrier 11a makes it possible for the user to swivel the hardtop for the processing, for example, for cleaning and for servicing and similar work, into a horizontal position. It is also possible, while the hardtop is taken-off, to use the carrier 11a in the case of a horizontal arrangement as a table, in which case a plate or the like can be placed on the carrier.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A supporting assembly for supporting a vehicle hardtop when the hardtop is removed from a vehicle, which hardtop includes first and second pairs of hardtop latching devices operable to connect the hardtop to a vehicle, said supporting assembly including a hardtop carrying device comprising:
    a first crossbar with a first pair of bearing devices operable to mate with the first pair of hardtop latching devices to connect the hardtop to the hardtop carrying device,
    a second crossbar with a second pair of bearing devices operable to mate with the second pair of hardtop latching devices to connect the hardtop to the hardtop carrying device, and
    a rod connecting the first and second crossbars to one another.

2. A supporting assembly according to claim 1, further comprising a movable support stand operable to support the carrying device with a rooftop carried thereby,
    wherein the carrying device and movable support stand are detachably connected to one another and configured to facilitate selective removal of the carrying device independently of any connection of the hardtop with the carrying device.

3. A supporting assembly according to claim 2, wherein the first pair of hardtop latching devices are latching locks and said second pair of hardtop latching devices are push-in tongues, said first pair of bearing devices including openings in the first crossbar for receiving parts of the rooftop latching devices to facilitate locking the same thereto, and
    wherein the second pair of bearing devices include openings in the second crossbar for accepting insertion of the push-in tongues.

4. A supporting assembly according to claim 3, wherein the moveable support stand includes:
    a basic frame,
    lateral strand struts at lateral edges of the basic frame, and bearing blocks supported on the basic frame,
    wherein, the carrying device is connected to the support stand, said lateral strand struts are connected with the first crossbar and the bearing blocks supportingly engage the second crossbar.

5. A supporting assembly according to claim 4, wherein the bearing blocks are constructed with receiving devices which are open upwardly for accommodating selective connection of same with the second crossbar.

6. A supporting assembly according to claim 2, wherein the first crossbar is disposed above the second crossbar when the carrying device is supported at the movable stand.

7. A supporting assembly according to claim 2, wherein the bearing devices are formed as recesses in the crossbars, and whereby, when the hardtop is carried by the carrying device, the latching locks are engaged in the recesses of the first crossbar and the push-in tongues are engaged in recesses in the second crossbar, with said push-in tongues being provided in a forward area of the hardtop.

8. A supporting assembly according to claim 2, wherein the moveable support stand includes:

a basic frame, lateral strand struts at lateral edges of the basic frame, and bearing blocks supported on the basic frame, wherein, when the carrying device is connected to the support stand, said lateral strand struts are connected with the first crossbar and the bearing blocks supportingly engage the second crossbar.

9. A supporting assembly according to claim 8, wherein the bearing blocks are constructed with receiving devices which are open upwardly for accommodating selective connection of same with the second crossbar.

10. A supporting assembly according to claim 2, wherein, when the carrying device is connected to the moveable support stand, the first and second crossbars are arranged in a diagonal plane of the moveable support stand such that the hardtop is arrangeable thereon in an approximately vertical bearing position, and wherein the second pair of hardtop latching devices are received in the second pair of bearing devices of the second crossbar in a forward area of the hardtop.

11. A supporting assembly according to claim 2, wherein the moveable support stand includes a receiving arrangement for bicycles which can stand vertically side-by-side.

12. A supporting assembly according to claim 2, wherein the moveable support stand and carrying device are configured to accommodate pivotal movement of the carrying device between a hardtop vertical position and a hardtop horizontal position, said moveable support stand including respective supporting tubes for holding the carrying device in the respective hardtop vertical and horizontal positions.

13. A supporting assembly according to claim 12, wherein the respective supporting tubes are holdable in a junction point of the crossbars of the carrying device.

14. A supporting assembly according to claim 13, wherein the respective supporting tubes include a shorter construction supporting tube for holding the carrying device in the hardtop vertical position and a longer tube for holding the carrying device in the hardtop horizontal working position.

15. A supporting assembly according to claim 14, wherein the supporting tubes are supported respectively on a sidebar of the support stand which faces away from the second crossbar.

16. A supporting assembly according to claim 13, wherein the supporting tubes are supported respectively on a sidebar of the support stand which faces away from the second crossbar.

17. A supporting assembly according to claim 2, wherein the moveable support stand includes a basic frame, wheels mounted under the basic frame, and tubular frame structures disposed on top of the basic frame and including means for detachable connecting with the respective first and second crossbars of the carrying device.

18. A supporting assembly according to claim 1, wherein the carrying device includes mounting holes for accommodating a screw connection of the carrying device to a wall.

19. A supporting assembly according to claim 1, wherein the first pair of hardtop latching devices are latching locks and said second pair of hardtop latching devices are push-in tongues, said first pair of bearing devices including openings in the first crossbar for receiving parts of the rooftop latching device to facilitate locking the same thereto, and wherein the second pair of bearing devices include openings in the second crossbar for accepting insertion of the push-in tongues.

20. A supporting assembly according to claim 1, wherein the bearing devices are formed as recesses in the crossbars, and whereby, when the hardtop is carried by the carrying device, the latching locks are engaged in the recesses of the first crossbar and the push-in tongues are engaged in recesses in the second crossbar, with said push-in tongues being provided in a forward area of the hardtop.

* * * * *